United States Patent [19]

Schieber

[11] 4,234,650
[45] Nov. 18, 1980

[54] LAMINAR CARBON MEMBER AND A METHOD OF MANUFACTURING IT

[76] Inventor: Franz Schieber, Pegnitzstrasse 12, D-8505 Röthenbach a.d. Pegnitz, Fed. Rep. of Germany

[21] Appl. No.: 909,528

[22] Filed: May 25, 1978

[30] Foreign Application Priority Data

May 27, 1977 [DE] Fed. Rep. of Germany ....... 2724131

[51] Int. Cl.$^2$ ......................... B32B 9/00; B32B 33/00
[52] U.S. Cl. .................... 428/280; 156/155; 156/307.3; 264/29.5; 264/29.7; 423/447.1; 423/447.2; 423/447.4; 427/228; 428/282; 428/408
[58] Field of Search ............ 428/250, 408, 282; 264/29.7, 29.5; 156/155, 306; 427/228, 369; 423/447.1, 447.2, 447.4

[56] References Cited

U.S. PATENT DOCUMENTS

| | | | |
|---|---|---|---|
| 3,174,895 | 3/1965 | Gibson | 423/447.1 |
| 3,174,895 | 3/1965 | Gibson | 264/29.7 |
| 3,462,289 | 8/1969 | Rohl et al. | 264/29.5 |
| 3,728,423 | 4/1973 | Shaffer | 264/29.5 |
| 3,859,158 | 1/1975 | Park | 423/447.1 |
| 3,917,884 | 11/1975 | Jahn | 264/29.7 |
| 3,932,568 | 1/1976 | Watts et al. | 264/29.7 |
| 3,936,535 | 2/1976 | Boder | 264/29.5 |
| 3,991,248 | 11/1976 | Bauer | 428/408 |
| 4,032,607 | 6/1977 | Schulz | 423/447.4 |
| 4,041,116 | 8/1977 | Baud | 264/29.5 |
| 4,064,207 | 12/1977 | DeCrescente et al. | 428/280 |
| 4,115,528 | 9/1978 | Christner et al. | 264/29.5 |

*Primary Examiner*—James Cannon
*Attorney, Agent, or Firm*—Gifford, VanOphem, Sheridan & Sprinkle

[57] ABSTRACT

A thin, laminar carbon member made of carbon or graphite felt impregnated with a carbonaceous, hardenable, cokable binder is hardened under the action of pressure and temperature and subsequently coked or graphitized in such a way that the carbon or graphite felt is only partially impregnated with the binder, i.e. with a solution of impregnating agent which is at least partially driven out of the cavities in the felt, but so that a thin coating of impregnating agent remains on the felt fibres, whereafter the felt returns to its original shape, is dried and then compressed to the desired thickness, during which the impregnating agent simultaneously condenses, whereafter the carbon member is calcined and graphitized. The such manufactured partially impregnated carbon member has a gross density of 0.1 to 0.8 g/cm$^3$ and a thickness of 0.1 to 5 mm, the ratio of the area to the thickness of the plate being at least 10$^5$.

13 Claims, 2 Drawing Figures

LAMINAR CARBON MEMBER AND A METHOD OF MANUFACTURING IT

BACKGROUND OF THE INVENTION

The invention relates to a thin, laminar or platelike carbon member made of carbon or graphite felt impregnated with a carbonaceous, hardenable, cokable binder, hardened under the action of pressure and temperature and subsequently coked or graphitized. The invention also relates to a method of manufacturing an aforementioned laminary carbon member.

DESCRIPTION OF THE PRIOR ART

Laminar carbon members of certain sizes can be mechanically made from fine-grained carbon members (hereinafter the term "carbon" also includes the graphite form of carbon). It is also known to produce laminar carbon members by rolling or compressing expanded graphite.

Thin laminar carbon members can be mechanically made from solid carbon members, up to approximately the following dimensions:

1 mm×100 mm×100 mm p1 2 mm×300 mm×300 mm
5 mm×500 mm×500 mm

In practice, the ratio of the maximum dimension of the plate to its thickness can be up to approx. 100:1. Laminar carbon members made by compressing expanded graphite are not mechanically strong, are expensive to manufacture, and are not rigid if thin.

Other known laminar carbon members are in the form of diaphragms measuring e.g. 60×0.5 mm. These members can be made by compressing fine-grained mixtures of lampblack and coke and a carbonaceous binder, followed by coking, by known methods. However, their dimensions cannot be made any larger, since the shrinkage during firing results in warping and/or cracking.

Laminar carbon members of varying porosity and gross density are used as loudspeaker diaphragms, electrodes for electric batteries or cells, catalyst substrates, diaphragms, seals, substrates for sintering processes, surface-heating elements and insulating or conductive material.

Owing to the aforementioned shrinkage during firing and the mechanical weakness, the laminar carbon members produced by the known methods can have an area A/thickness d ratio of only up to approx. $5 \times 10^4$.

SUMMARY OF THE PRESENT INVENTION

It is an object of the present invention to provide a method of manufacturing a laminar, plate-like carbon member of the aforementioned type which is not only cheaper but also yields laminar members having a much larger surface/thickness ratio.

According to the further object the laminar carbon members produced by this method should have excellent strength, rigidity and dimensional stability in spite of their thinness.

It is another object of the invention to increase the gross density and conductivity by repeatedly impregnating and coking the laminar carbon member during manufacturing it.

To this end, according to the invention, the partially impregnated carbon member has a gross density of 0.1 to 0.8 g/cm$^3$ and a thickness of 0.1 to 5 mm, the ratio of the area to the thickness of the plate being at least $10^5$.

The carbon felt can be partially impregnated by immersion or in the vacuum/pressure process, followed by elimination of the excess impregnating agent by rolling, pressing, or evaporation.

DETAILED DESCRIPTION OF THE PRESENT INVENTION

Figure 1:
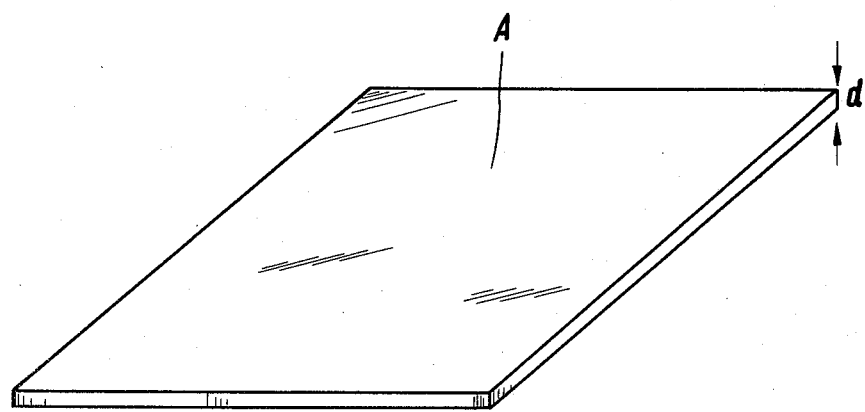
FIG. 1 is perspective view of a laminar carbon member having a surface A and a thickness d.
Figure 2:
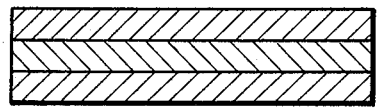
FIG. 2 is a sectional view of a laminated carbon member, wherein the thickness of the carbon member is exaggerated in order to illustrate the laminations.

During the partial impregnation the felt is first completely impregnated with the impregnating agent. The impregnating agent can be a thermoplastic or a duroplastic material or solutions thereof, e.g. a methanolic phenol formaldehyde resin solution. Next, the liquid in the pores is removed in the aforementioned manner, so that only the surfaces of the felt fibres remains coated with impregnating agent and the felt, owing to its natural elasticity, returns to its original shape. Next, because of the empty pores therein, the felt can be compressed to a thickness for producing a laminar member, which is characterized in that the partially impregnated carbon member has a gross density of 0.1 to 0.8 g/cm$^3$ and a thickness of 0.1 to 5 mm, the ratio of the area to the thickness of the plate being at least $10^5$.

In an advantageous embodiment of the invention, the laminar carbon member can be built up of a number of layers which also have different physical properties. In the latter case in a number of applications of the laminar carbon member, the individual layers advantageously are given different porosities and/or different pore distributions.

The laminar member can be built up from a number of layers by compressing a number of layers of felt while still wet before condensing. Alternatively, the carbon member can be made up of a number of layers of felt which are bonded together by binders after coking.

The pressure applied during the condensation process is adjusted so that the partially impregnated carbon felt is compressed to a given thickness, e.g. from 5 mm to 1 mm. To this end, as previously explained, the preceding impregnation is only partial, i.e. the individual fibres of the carbon or graphite felt retain a thin coating of highly-viscous binder after drying, so that the impregnated felt can be compressed to the required dimensions and the resulting plate can be calcined after condensation, without cracking or warping. As a result of the last-mentioned impregnation and subsequent compressing and condensation, the laminar carbon member has a gross density of 0.1 to 0.8 g/cm$^3$ after calcination. It has been found in principle that if the aforementioned conditions are followed, flat carbon members can be produced with a practically unlimited surface/thickness ratio.

From the above it follows that an important characteristic feature of the manufactured laminar, platelike carbon member is the fact that it is only "partially" impregnated. This means, that the felt is at first immersed in the liquid impregnating agent and sucks in as a sponge the impregnating solution. Thereafter, the impregnating solution will be squeezed out of the cavities of the felt so that these cavities are nearly free of the solution and only the surfaces of the felt fibres remain covered by the impregnating agent and the felt returns to its original shape because of its elastic property. This felt is then dried resulting in a "partially impregnated" member which is then compressed to the desired thickness, during which the impregnating agent simultaneously condenses. Finally, the received carbon member can be calcined and graphitized as stated above.

Moreover, it should be noted that the ratio of the plate area A to the plate thickness d, both measured in the same dimensions, e.g. cm$^2$ or cm, is not in itself dimensionless but has the dimension cm. For simplicity, the dimensionless number $10^5$ or $10^8$ is used in this description and the following claims.

The method will be further apparent from the following examples.

EXAMPLE 1

Carbon felt 5 mm thick and having a surface of 400×700 mm was impregnated by immersion in 20% methanolic phenol formaldehyde resin solution. The wet felt was suspended from a corner, whereupon most of the impregnating solution ran out. After about 60 minutes the sheet of felt, still wet, was placed horizontally on a perforated plate and left overnight. The resulting material was still slightly sticky, but the solvent had completely evaporated. The resulting pretreated sheet was compressed to 1.5 mm between paper layers in a hot veneer press and heated to 120° C. in 3 hours. After cooling, the paper, which adhered loosely, could easily be pulled off. The felt was now completely straight and rigid, i.e. it had turned into a carbon plate. The resin therein was converted into carbon by calcining at 1200° C. in an inert atmosphere. As a result of calcination, the carbon plate had shrunk by about 1/10 mm in the thickness direction. The other dimensions remained unaltered.

Porosity: 80%
Gross densitiy: 0.28 g/cm$^3$
Electric resistivity: 900 Ω mm$^2$/m

EXAMPLE 2

A laminar carbon member produced as in Example 1 was condensed under pressure and again impregnated with 20% methanolic phenol formaldehyde resin solution. After the solvent had evaporated, the member was calcined in known manner. It then had the following properties:

Porosity: 70%
Gross density: 0.35 g/cm$^3$
Electric resistivity: 500 Ω mm$^2$/m

EXAMPLE 3

A laminar carbon member produced as in Example 1 was calcined and thrice impregnated with 20% methanolic phenol formaldehyde solution; after each impregnation step the solvent was driven off and the member was hardened at 150° C. for 3 hours. After the last hardening operation the member was again calcined in known manner. It then had the following properties:

Porosity: 57%
Gross density: 0.77 g/cm$^3$
Electric resistivity: 300 Ω mm$^2$/m

I claim:

1. A thin laminar porous carbon member having a gross density of 0.1 to 0.8 gm/cm, a thickness of 0.1 to 5 mm and a ratio of surface area to thickness of at least $10^5$ produced by carbonizing a carbon fiber felt impregnated with a heat and pressure hardened carbonaceous binder coating substantially all the carbon fibers of the felt in such a manner that the porosity of the felt is retained.

2. A laminar carbon member as defined in claim 1, wherein said ratio of the surface area to the thickness is not more than $10^8$.

3. A laminar carbon member as defined in claim 1 wherein said carbon member is built up in individual layers of said carbon felt.

4. A laminar carbon member as defined in claim 3 wherein said individual layers have different physical properties.

5. A laminar carbon member as defined in claim 4 wherein said individual layers have different porosities.

6. A laminar carbon member as defined in claim 3 wherein said individual layers have different pore distributions.

7. A method of forming a thin carbon member from a hardenable binder and porous carbon felt, said carbon felt being formed of carbon fibers, said method comprising the steps of;
 (a) impregnating said porous felt with a carbonaceous, hardenable and cokable binder such that substantially all of said fibers are coated with said binder;
 (b) eliminating some of said binder from said porous felt to the extent that said impregnated felt is porous; and
 (c) hardening said binder with heat and pressure to produce a rigid, partially impregnated, porous carbon member
 (d) carbonizing said member by heating to produce a rigid, high strength, dimensionally stable and porous carbon member having a gross density of 0.1 to 0.8 g/cm, a thickness of 0.1 to 5 mm, and a surface area to thickness ratio of at least $10^5$.

8. A method as claimed by claim 7 wherein said binder is a duroplastic material.

9. A method as claimed by claim 8 wherein said binder is a methanolic phenolformaldehyde resin solution.

10. A method as claimed by claim 7 wherein said binder is a thermoplastic material.

11. A method as claimed by claim 7 further comprising repeated impregnation and coating to increase the gross density and to improve conductivity.

12. A method as claimed by claim 7 further comprising pressing together a number of said layers of felt before hardening.

13. A method comprising the step of binding a plurality of thin laminar carbon members produced by the method of claim 7.

* * * * *

UNITED STATES PATENT AND TRADEMARK OFFICE
CERTIFICATE OF CORRECTION

PATENT NO. : 4,234,650
DATED : November 18, 1980
INVENTOR(S) : Franz Schieber

It is certified that error appears in the above-identified patent and that said Letters Patent are hereby corrected as shown below:

Please insert the following assignee on the introduction of the patent:

ASSIGNEE: C. Conradty Nurnberg GmbH & Co. KG
Grunthal, Germany.

Signed and Sealed this

Twenty-fourth Day of March 1981

[SEAL]

*Attest:*

RENE D. TEGTMEYER

*Attesting Officer*  *Acting Commissioner of Patents and Trademarks*